United States Patent [19]

Moriizumi et al.

[11] Patent Number: 5,015,531

[45] Date of Patent: May 14, 1991

[54] VINYL CHLORIDE-COATED STEEL SHEET

[75] Inventors: Shuichi Moriizumi, Ibaraki; Kenichi Masuhara, Chiba; Hidetoshi Yamabe, Chiba; Takao Tomosue, Chiba; Kouji Mori, Chiba; Hisaharu Kaneko, Ibaraki, all of Japan

[73] Assignee: Lonseal Corporation & Nissin Steel Co., Ltd., Tokyo, Japan

[21] Appl. No.: 259,190

[22] Filed: Oct. 18, 1988

Related U.S. Application Data

[62] Division of Ser. No. 83,372, Aug. 10, 1987, abandoned.

[51] Int. Cl.$^5$ .............................................. B32F 15/08
[52] U.S. Cl. ................................. 428/463; 428/520; 156/307.7; 156/307.3; 156/243
[58] Field of Search ............................... 428/463, 520; 156/307.7, 307.3, 243

[56] References Cited

U.S. PATENT DOCUMENTS

| | | | |
|---|---|---|---|
| 3,719,541 | 3/1973 | Takahashi | 156/275.7 |
| 3,862,066 | 1/1975 | Reiter et al. | 260/29.9 |
| 3,991,135 | 11/1976 | Kraft et al. | 260/878 |
| 4,159,261 | 6/1979 | Dieckmann | . |
| 4,239,679 | 12/1980 | Rolls et al. | 260/42.49 |
| 4,306,927 | 12/1981 | Funk et al. | 156/243 |
| 4,402,887 | 9/1983 | Kuriyama et al. | 264/22 |
| 4,423,188 | 12/1983 | Witschard | . |
| 4,634,629 | 1/1987 | Inaba et al. | . |

FOREIGN PATENT DOCUMENTS

| | | |
|---|---|---|
| 747196 | 3/1970 | Belgium . |
| 45-034453 | 5/1970 | Japan . |
| 51-081844 | 7/1976 | Japan . |

Primary Examiner—Edith Buffalow
Attorney, Agent, or Firm—Sandler, Greenblum & Bernstein

[57] ABSTRACT

A method of manufacturing a vinyl chloride-coated steel sheet involving the steps of coating electron ray curable adhesives on the surface of the thin metal sheet, such as a zinc plated steel sheet or cold rolled steel sheet, laminating a vinyl choride film of decorative and corrosion resistant protecting property to the coated surface and irradiating electron rays the upper surface of the coated sheet with thereby bonding the film with the metal sheet as raw material, wherein the vinyl chloride film is formed by applying a calendering or extruding process to a blend including a vinyl chloride resin obtained by suspension polymerization and, from 20 to 40 parts by weight of a plasticizer, dialkyl tin mercaptide type stabilizer, an acryl oligomer type lubricant and, optionally, pigments and other ingredients.

Combined use of the dialyl in mercaptide stabilizer and the acryl oligomer lubricant has been found to be particularly suitable for electron ray irradiation, as well as to the subsequent UV-ray exposure which would otherwise cause significant degradation in the vinyl chloride coating.

11 Claims, No Drawings

VINYL CHLORIDE-COATED STEEL SHEET

RELATED APPLICATIONS

This application is a Division of U.S. Ser. No. 07/083,372 filed Aug. 10, 1987 entitled "Method of Manufacturing A Vinyl Chloride Coated Metal Sheet" now abandoned, and U.S. Ser. No. 07/259,191 filed concurrently herewith entitled "A Method of Manufacturing A Vinyl-Chloride Film".

BACKGROUND OF THE INVENTION

1. Field of the Invention

The present invention relates to a novel vinyl chloride-coated steel sheet. More specifically the present invention is directed to a vinyl chloride coated steel sheet made by a method of manufacturing a vinyl chloride-coated steel sheet which comprises coating the surface of a thin metal sheet, as the raw material such as a zinc-plated steel sheet, with electron ray curable adhesives, laminating a vinyl chloride film to the coated surface, and then irradiating the upper surface of the coated sheet with electron rays thereby bonding the film to the metal sheet.

2. Description of Background and Material Information

Vinyl chloride-coated steel sheets have conventionally been prepared by coating the surface of thin metal sheets such as zinc-plated steel sheet or cold rolled steel sheet, with vinyl chloride resin paint, and followed by applying heating and baking. The vinyl chloride resin paint used in this case is commonly referred to as a vinyl resin paste (hereinafter referred to as a "paste") composed of a vinyl chloride resin normally used in paste polymerized emulsion polymerization and DOP, or other similar plasticizer, stabilizer and other ingredients admixed therewith into a viscous flowing liquid product, which is coated to a predetermined thickness on a steel sheet by a fixed blade method or reversed roll method, and heated in a heating furnace to thereby gel the coating film of the vinyl chloride resin paste.

The above-mentioned method (hereinafter referred to as a "paste coating method") involves the following drawbacks.

(1) Since a relatively large amount of plasticizer has to be used in order to obtain a flowing paste suitable to the coating process, it is difficult to obtain a coating film with low plasticizer content (the coating film of lower plasticizer content has higher film strength and is less contaminated).

(2) Since the viscosity of the paste has to be lowered using plasticizers in order to increase the fabrication speed (for example higher than 60 m/min), the drawback as described in (1) above becomes even more pronounced.

(3) Heating at high temperature (for example, higher than 180° C.) is necessary to gel the paste so as to obtain a firm coating film and the cost of heating is enormous.

(4) If the filtration for the paste is inadequate (or, if the paste becomes contaminated coating detects or pinholes tend to occur).

(5) Since requisite thick coating can not be obtained by one application of pastes in view of the coating film strength, the coating step has to be repeated several times each of the coating steps being followed by a heat treatment to gel the paste each time.

In addition to the paste coating method, previously described a method of laminating a vinyl chloride film prepared separately and bonded to a zinc-plated steel sheet using adhesives is also known. In this case, conventional adhesives employed are generally classified as described below:

(1) Synthetic resins of excellent bondability (for example, acryl-vinylacetate copolymer) properly dissolved in a solvent . . . solution type.

(2) Synthetic resins of excellent bondability dispersed in water . . . emulsion type.

(3) Adhesives composed of low molecular weight liquid synthetic resins as the main ingredient having a curing agent added thereto for utilizing the reaction activation upon polymerizing reaction . . . , e.g., two pack curing type.

(4) Synthetic resins melted or activated upon heating . . . , e.g., hot melt type or thermoadhesion type.

(5) Adhesive layers disposed on both sides of an adherant for bonding upon contact of them . . . , i.e., contact type.

However, like the paste coating method, these methods have various drawbacks because heating is required for evaporating the solvent or water in (1) and (2), insufficient strength is obtained until the completion of the polymerizing reaction, and at least several hours of time are necessary until the completion of the polymerizing reaction in, i.e., and heating or drying time (oven time) is necessary in the step of disposing the adhesive layers on the surfaces of the adherant in (4) and (5).

In view of the disadvantage of conventional processes described above, a method of using electron ray curable adhesives has been proposed to overcome these disadvantages.

As for the method, there have been various proposals, for example, in Japanese Patent Application Laid Open Nos. Sho 58-174475, 59-86676, 60-168644 etc. In the case of Japanese Patent Application Laid Open No. Sho 58-174475, a particular mixture comprising (A) from 10 to 69.95 parts by weight of a urethane polyacrylate having an average molecular weight of 500 to 20,000, (B) from 10 to 40 parts by weight of a polyol polyacrylate, (C) from 20 to 79.95 parts by weight of a radical polymerizable monovinyl compound and (D) from 0.05 to 10 parts by weight of a radical polymerizable phosphor-containing compound, as an electron ray curable adhesive, is coated onto a steel sheet to a film thickness of about 6 $\mu$m, and a soft vinyl chloride sheet of 0.2 mm thickness is laminated, as a vinyl chloride coating layer, to the upper surface thereof followed by irradiation with electron rays at an acceleration voltage of 300 KV and at a dose of 20 Mrad. While the time for the irradiation is dependent on the dose, the adhesives are usually cured on the order of several seconds, thereby obtaining a vinyl chloride-coated steel sheet having an intense bonding strength.

The electron ray curing method of the present invention is different from the usual adhesion method, as described above, since the substances used as adhesives have a 100% solid content, i.e., no solvent, and do not require a separate drying. Inasmuch as the electron ray curing method requires only electron ray irradiation as the means for causing the adhesive layer to exhibit effective bonding force with the adhesives this method eliminates any need for heating otherwise required for this purpose.

Consequently, this results in various advantages in the method of manufacturing a vinyl chloride-coated steel sheet. First, inasmuch as neither drying nor heating means are required in the bonding step and the requisite bonding cure can be obtained merely by irradiation with electron rays as described above, thereby simplifying the manufacturing process and enhancing high speed production. Further, since heating is not necessary either for drying, gelation or curing of the adhesives during the manufacturing step for the vinyl chloride-coated steel sheet, the decorative appearance of the laminated soft vinyl chloride sheet can be as it is maintained, if desired. Related to this, in the case of a conventional vinyl chloride-coated steel sheet, an embossed design is typically applied to the surface of the vinyl chloride coating by passing the vinyl chloride-coated steel sheet through an embossing device. However, since the vinyl chloride coating layer is thin, only the thin and shallow embossed design, such as a feather- or satin-like embossed pattern can be obtained, which is often unsatisfactory from the aesthetic or decorative point of view. In the case of the bonding method, however since an optional embossed design can be applied to the surface of a previously molded soft vinyl chloride sheet, it is possible to use those applied with hessian design, leather-like design in addition to various types of reflective embossed designs. However, in the case of a conventional bonding method, as described above, since the production step inevitably involves a heating step, subjecting the soft vinyl chloride sheet applied with such various designs to heating often causes fatal defects such that the embossed design applied to the surface is eliminated or offset by the heating. Inasmuch as such a heating is not required in the case of the electron ray curing method in this regard, however various embossed designs which may be applied to the surface of the soft vinyl chloride sheet are not degraded and the shape can be maintained as it is, and, accordingly, a vinyl chloride-coated steel sheet exhibiting excellent decorative characteristics that can not be obtained in a conventional vinyl chloride-coated steel sheet can be obtained by using the electron ray curing method of the present invention.

Since the electron ray curing method of the present invention is a novel manufacturing method for the vinyl chloride-coated steel sheet having such an advantageous feature, it would be expected that the electron ray curing method will become a popular substitute for the conventional paste coating method and extensive studies have now been made in attempts to discover suitable electron ray curable adhesives. However, it has been found that there are difficulties in the method of manufacturing the vinyl chloride-coated steel sheet by the electron ray curing method, which hinders the industrial use of the method. One of the main obstacles to overcome is that the vinyl chloride sheet laminated on the surface of the steel sheet with an aim of decorative coating and protective coating is remarkably degraded by the irradiation dose of electron rays required to cure the adhesives. A dose higher than a certain level is required for curing the electron ray curable adhesives and a vinyl chloride sheet is not degraded if the dose is lower. In this regard, it has been found that a dose of higher than 10 Mrad is required to cure the adhesives and all of the conventional vinyl chloride sheets are degraded by the electron rays at such a dosage, although this is not the case if the irradiation dosage is lower.

Vinyl chloride-coated steel sheets have various uses, such as roofing materials, exterior materials, decks and fences for verandas, portable warehouse, and similar outdoor applications. Accordingly, the vinyl chloride sheet used in the method is unavoidably subjected to UV-ray irradiation after undergoing the irradiation of electron rays at a predetermined dose and is exposed under extremely severe degrading conditions that can not be recognized at all in the degradation test known so far.

SUMMARY OF THE INVENTION

The present invention is directed to overcoming the disadvantages, as described above, and it is an object of the invention to provide a vinyl chloride sheet suitable for the production of a vinyl chloride-coated steel by way of an electron ray curing method.

The object of the present invention can be attained by a method involving the steps of properly applying pre-treatments, such as mechanical polishing, phosphoric acid treatment, chromate treatment, pickling, and like preparations to the surface of a thin metal sheet such as a zinc-plated steel sheet a, cold rolled steel sheet, various kinds of plated steel sheets, stainless steel sheets and aluminum sheets, coating electron ray curable adhesives on the surface thereof, laminating a vinyl chloride film having decorative and corrosion resistant protecting functions to the coated surface and then irradiating the upper surface thereof with electron rays thereby bonding the film to the metal sheet, wherein the vinyl chloride film is formed by applying a calendering or extrusion process to a blend prepared by combining from 20 to 40 parts by weight of a plasticizer, a dibutyl tin mercaptide type stabilizer, an acryl oligomer type lubricant and, optionally, pigment of other ingredient with a vinyl chloride resin obtained from suspension polymerization.

DETAILED DESCRIPTION OF THE INVENTION

In the method according to the present invention, the vinyl chloride resin obtained from suspension polymerization means vinyl chloride resins other than so-called paste grade vinyl chloride resins obtained by emulsion polymerization and it also includes vinyl chloride resins obtained from bulk polymerization. Further, the vinyl chloride resin obtained from suspension polymerization in the present invention includes, in addition to the vinyl chloride homopolymer, those vinyl chloride type copolymers containing a small amount of functional group, such as vinyl acetate and ethylene capable of forming a copolymer with vinyl chloride. Further, the vinyl chloride resin obtained from suspension polymerization includes, in addition to the vinyl chloride resin, those polymer blends which contain a small amount of blending polymer, such as vinyl chloride-vinyl acetate copolymer, EVA copolymer with the vinyl acetate content of higher than 50%, vinyl chloride-ethylene copolymer, NBR, polyurethane and polyester added thereto. In this case, the term "small amount" means the additional amount or polymer content of from 0.1 to 15 parts by weight and within on up to 10 parts by weight as a practical range.

While various kinds of vinyl chloride homopolymers have been produced and marketed at present from 4-5 companies, the behaviors of these vinyl chloride homopolymers to the UV - ray degradation after the electron ray irradiation are not always identical but a considerable difference is present among them depending on the kinds of products from the companies. Although not wishing to be bound by any particular theory, it is believed that the difference in the polymerization steps in each of the companies, that is, the difference in view of the polymerization catalyst, surface active agent, washing step for the polymer, and other parameters gives an effect on the properties as described above.

Since the properties vary in the polymer blend process, that is, in the case of using other blending polymers, depending on the kind and the amount of the polymer used, they should be examined depending on the respective cases.

While usual plasticizers for vinyl chloride resins can be used for the plasticizers used in the method according to the present invention, particularly suitable plasticizer to the method of the present invention is a phthalic ester type plasticizer represented by DOP and an aliphatic dibasic acid ester such as DOS. It should be noted, however, that a chlorinated paraffin or polyester type plasticizer tends to promote UV-degradation after the irradiation with electron rays. In addition, care should be taken when using phosphoric acid ester type plasticizers since the suitability is significantly different depending on the type.

As the phthalic acid ester type plasticizer, dibutyl phthalate (DBP) diheptyl phthalate (DHP), di-2-ethylhexyl phthalate (DOP), dinonyl phthalate (DNP), diisodecyl phthalate (DIOP), are preferred with DOP being most suitable.

As the aliphatic dibasic ester, succinic ester, adipic ester, azelaic ester, sebacic ester, dodecandicarboxylic ester, are preferred and, among all, dioctyl sebacate (DOS) is most suitable for purposes of the method according to the present invention as described herein.

The amount of the plasticizer contained in the laminated sheet for use in the vinyl chloride-coated sheet is a particularly important factor for purposes of contamination-resistance, scratch-resistance and maintenance of strength. In the case of the paste coating method, the plasticizer has to be added by more than 50 PHR (PHR as described herein means parts by weight of addition based on 100 parts by weight of the vinyl chloride resin) and yet such amount is still often insufficient for purposes of contamination-resistance and the scratch resistance. In contrast, in the case of the method according to the present invention, the plasticizer content is lower, i.e., within the range of the addition amount between 20 PHR and 40 PHR, and yet benefits from the advantageous characteristics of the electron ray curing method. The vinyl chloride resin sheet in accordance with the present invention having the plasticizer content within the range added thereto i.e., 20–40 PHR, which may be referred to as a semi-rigid (semi-soft) material than as a soft material, is not only excellent as to contamination resistance and the scratch-resistance, but also excellent in possessing various kinds of embossed designs formed with an aim of providing a decorative appearance, in addition to being extremely compatible with electron ray curing adhesives. In contrast, a so-called hard film sheet having a plasticizer content of less than 20 PHR, particularly less than 10 PHR, is liable to undergo UV-ray degradation after the electron ray irradiation. Related to this, in the case of a soft film sheet with the plasticizer content of higher than 40 PHR and, particularly, 45 PHR, the bonding suitability with the electron ray curable adhesives is reduced failing to obtain a sufficient bonding strength, and this can be considered as one of the main problems of such a system.

In addition, kind of the stabilizer used in the vinyl chloride resin film in the method according to the present invention is an extremely important factor. In this regard, the present inventors have investigated the electron ray adaptibility of several hundred stabilizers and, as a result, have found that dibutyl tin mercaptide is most preferably in combination with an acryl oligomer type lubricant in view of the characteristics exhibited after the electron ray irradiation and the characteristics prior to the UV-ray degradation after the electron ray irradiation. It has been discovered that fatty acid soaps of metals, such as Pb, Cd, Zn, Ca and Ba, usually employed as the stabilizer for the vinyl chloride resin, can not be used. In this regard, it is surprising that, among the fatty acid soaps, Pb, Cd type soaps produce dot-like brown spots at the instance of irradiating electron rays at 10 Mrad, soaps of Ba, Zn, Ca etc. produce black change or great amount of blown black spots within a short time upon irradiation of UV-rays, although they produce no visible small spots after the irradiation of electron rays.

Moreover, although, there are three conventional types of tin stabilizers i.e., laurate type, maleate type and mercaptide type, it has been discovered that the former two types are poor in the UV-ray degradation characteristics after the irradiation of electron rays and produce brown spots when observed under weatherometer test for 300 hours.

In contrast, the mercaptide type stabilizers generally show the following advantageous features in that they:

(1) have heat stability several times as high as tin maleate type and are most the preferred type of stabilizers, (2) have excellent transparency, (3) show excellent stabilizing effect when blended with copolymers and other kind of polymers (for example, ABS and MBS), (4) have good water proofness, and (5) show no blooming in the soft blending.

On the other hand, however, it is known that they:

(1) exhibit peculiar odors, (2) are poor in the weather proofness, and (3) form colored sulfide with heavy metals such as Pb and Cd.

Although it can be expected from the advantageous features (1)–(5) that the stabilizer is suitable to the method according to the present invention, the latter drawbacks, particularly, the poor weather proofness (2) can forecast, conversely, the UV-ray degradation after electron ray irradiation.

It is also known that tin mercaptide type stabilizers are poor in the lubricating performance in the case of actual calendering and, accordingly, addition of a lubricant is essential.

The tin mertaptide type stabilizer suitable for purposes of the present invention generally has the following structural formula:

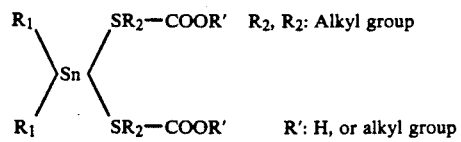

The alkyl group is introduced as $R_1$, $R_2$, particularly, $R_1$ is important for purposes of the stabilizer used in accordance with the present invention.

Dioctyl tin mercaptide using an n-octyl group and dibutyl tin mercaptide using butyl group as $R_1$ is well-known, and both of them show excellent suitability as the stabilizer for use in the method according to the present invention. However, although the former dioctyl tin mercaptide was effective when used in combination with an aliphatic dibasic acid ester type plasticizer such as DOS, it was poor in compatibility with phtalic ester type plasticizers such as DOP and DIDP, and produced brown spots in a short period of time by the UV-ray exposure after the electron ray irradiation. However, dibutyl tin mercaptide surprisingly shows an excellent compatibility with phtalic esters, such as DOP and DIDP as well as on excellent compatibility with aliphatic dibasic acid esters, such as DOS and DOA.

An important factor to be noted in the electron ray curing method is that these effects of the dialkyl tin mercaptide are greatly dependent on the lubricant used. Selection of an external lubricant is particularly important and, although there have been various types of lubricants, such as stearic acid, hydroxy stearic acid, synthetic paraffin, fatty acid ester of pentaerythritol and various kinds of high molecular esters, the range of selection is extremely limited in the case of the electron ray curing method. The present inventors have investigated electron ray irradiation suitability for various lubricants and, as a result, have found that a liquid acryl oligomer is extremely effective and that it shows a significant effect in coexistence with dibutyl tin mercaptide.

While blending pigments, in addition to various types of blending agents, as described above, may be included in the vinyl chloride film used for the method of manufacturing a vinyl chloride-coated steel sheet by the electron ray curing process of the present invention, electron ray irradiation suitability has to be examined for individual blending agents on a case by case basis. Although titanium is excellent in hiding property and is frequently used as a pigment in view of its suitability for use in vinyl chloride-coated steel sheets, it has been discovered that the UV-ray degradation of such vinyl chloride-coated steel sheets after the electron ray irradiation is remarkably amplified in the case of adding titanium oxide to the blend, as described above. This phenomenon is particularly remarkable when observed in comparison with a transparent sheet without added pigment. It is believed that the phenomenon is due to the fact, in with case of irradiating the electron rays that electron rays are subjected to random reflection by the pigment particles contained in the sheet thereby increasing the electron dose to the resin layer surrounding the periphery of the pigment particles. Accordingly, if the blending agents are not suitably be selected, the defects are developed at once in the case of the blend incorporating titanium oxide. While on the other hand, in the case of a suitable system of blending agents, the property does not change at all in UV-ray exposure test after the electron ray irradiation even by the addition of titanium oxide and it shows excellent suitability.

Various embodiments of the method according to the present invention will now be described specifically referring to the following examples.

EXAMPLES 1 AND 2, COMPARATIVE EXAMPLES 1-8

After sheeting to a each of the blends shown in Table 1 to a 0.1 mm thickness using a test roll at 165° C., electron rays at 10 Mrad were irradiated by using a Curetron electron ray irradiation device (manufactured by Nissin High Voltage Co; 200 Kev-20 mA), and then UV-rays were irradiated for 300 hours using a weatherometer (UV-ray long life weatherometer WEL-2; black panel temperature at 63° C., manufactured by Suga Shikenki Co.).

As a result, it was found that the electron ray irradiation suitability was different depending on the composition of the vinyl chloride resins, in which the resins, I-1, II-2 were comparatively excellent.

EXAMPLES 3 AND 4, COMPARATIVE EXAMPLES 9-16

Films were prepared using the same procedures as in Example 2, and electron ray irradiation and UV-ray exposure were applied except for replacing the plasticizer and epoxidized soybean oil in Example 2 with the plasticizers and epoxidized oils shown in Table 2. The experimentation was conducted by the method shown in the remarks in Table 1.

As shown in Examples 3 and 4, in the case of dioctyl tin mercaptide (Mark 465E), the electron ray suitability to DOS was found to be extremely excellent. In the case of other plasticizers, although excellent suitability is shown for transparent films (Comparative Examples 11, 13, 14, 15 and 16), remarkable discoloration is shown in any of the white films and it can be seen that they are remarkably poor as compared with those in Examples 3 and 4.

EXAMPLES 5, 6, 7 AND COMPARATIVE EXAMPLES 17-21

As shown in Table 3, in Examples 5, 6 and 7, DOP was used as the plasticizer and dibutyl tin mercaptide was used, instead of dioctyl tin mercaptide used in Examples 1-4, as the stabilizer. In the Comparative Example 19, the amount of the stabilizer is 1.5 PHR, which is somewhat insufficient, and it can be seen that the suitable amount is from 3.0 to 4.5 PHR (Examples 5 and 6). However, if the amount use stabilizer is increased to 6.0 PHR, the transparent film is colored somewhat pale brown (not dot-like but appears to be colored pale brown entirely). It is considered that the phenomenon is due to the electron ray degradation of excess stabilizer.

In Comparative Examples 17 and 18, a small amount (0.1, 0.2 PHR) of zinc stearate was used in combination with di-n-octyl tin mercaptide. Although both of the transparent and white films show some improvement as compared with Example 2, the degree of coloration in the white film shows that this amount of zinc stearate can not be used.

In Comparative Examples 19, 20 and 21, if dibutyl tin mercaptide is used, but in a small amount, remarkable coloration is shown for the white film (Comparative Example 19) and the effect of the addition of zinc stearate in this case is lower than that of di-n-octyl tin mercaptide.

EXAMPLES 8, 9, 10, COMPARATIVE EXAMPLES 22-26

Examples 8-10 are directed to the method of the present invention wherein the vinyl chloride film is formed using a calendering technique. Although it can be seen that the acryl oligomer type liquid lubricant is extremely effective as the external lubricant, it can also be seen that one of two types of acrylic type high molecular lubricants can not be used substantially and the other of them shows remarkable stickiness within 20 minutes. In this regard, the acryl oligomer type liquid lubricant has an excellent characteristic and does not suffer from the effect of UV-ray exposure at all after electron ray irradiation.

One example of the acryl oligomer type lubricant is shown in Table 5. The acryl oligomer type lubricant is extremely effective and shows excellent roll workability and, at the same time, electron ray irradiation characteristics in combination with DOS and di-n-octyl tin mercaptide type stabilizer in Examples 3 and 4.

As shown in Examples 1-10 and Comparative Examples 1-26, the UV-ray degradation characteristics of the vinyle chloride resin after the electron ray irradiation are quite different from any of degradation mechanisms known so far, and they belong to the quite unknown field.

Some of the most surprising features among those found by the present inventors are as follows:

(1) The electron ray irradiation characteristics of the vinyl chloride resins is different depending on the manufacturers. Inasmuch as the polymerization conditions and the treatment method performed subsequently by each of the manufacturers are not apparent, what factors are effective in this regard are not well known but this will be important in the future development in the relevant field of art.

(2) All of the metal soap type stabilizers generally used so far can not be used at all. This indicates that the electron ray irradiation imposes extremely severe conditions on the polymers. Considering the increasing application use of radioactive rays, including electron rays, an urgent development may be necessary for the study of stabilizers effectively used for these applications.

(3) Among the tin type stabilizers, only the dialkyl tin mercaptide is effective in view of the electron ray irradiation characteristic. When considering its combination with a lubricant upon film fabrication, such as calendering, it can not be said that the acrylic high molecular type lubricant is effective and its combination with the acrylic oligomer type lubricant is optimum at present. This may be an important key to the feature development in the relevant field of art.

(4) The electron ray irradiation characteristics, however, more remarkable in the blending system incorporated with a white pigment than in the transparent film, which is otherwise identical.

Thus, the method according to the present invention, i.e., Examples 3-10 shows extremely excellent characteristic that can not be obtained using any other blend, for example as illustrated in the other examples (Comparative Examples). Particularly, the combination of DOS and di-n-octyl tin mercaptide in Examples 3 and 4 show that DOS has a peculiar suitability in the electron ray irradiation characteristic different from other aliphatic dibasic acid esters.

In Examples 5-10 illustrating the method according to the present invention, phthalic ester type plasticizer as a general purpose plasticizer such as DOP, as well as an expensive plasticizer such as DOS can be used, if dimethyl tin mercaptide is used as the stabilizer, which can be considered as extremely effective means.

TABLE 1

| | NO. | | | | | | | | | |
|---|---|---|---|---|---|---|---|---|---|---|
| | Example | | Comparative Example | | | | | | | |
| Blend | 1 | 2 | 1 | 2 | 3 | 4 | 5 | 6 | 7 | 8 |
| Vinyl chloride resin*1 | | | | | | | | | | |
| I-1 | 100 | | | | | | | | | |
| I-2 | | 100 | | | | | | | | |
| II-1 | | | 100 | | | | | | | |
| II-2 | | | | 100 | | | | | | |
| III-1 | | | | | 100 | | | | | |
| III-2 | | | | | | 100 | | | | |
| IV-1 | | | | | | | 100 | | | |
| IV-2 | | | | | | | | 100 | | |
| V-1 | | | | | | | | | 100 | |
| V-2 | | | | | | | | | | 100 |
| DOP | 30 | 30 | 30 | 30 | 30 | 30 | 30 | 30 | 30 | 30 |
| Epoxidized soybean oil | 5 | 5 | 5 | 5 | 5 | 5 | 5 | 5 | 5 | 5 |
| tin mercaptide*2 | 1.5 | 1.5 | 1.5 | 1.5 | 1.5 | 1.5 | 1.5 | 1.5 | 1.5 | 1.5 |
| Lubricant*3 | 0.5 | 0.5 | 0.5 | 0.5 | 0.5 | 0.5 | 0.5 | 0.5 | 0.5 | 0.5 |
| Estimation*4 | | | | | | | | | | |
| transparent | 7 | 6 | 4 | 5 | 8 | 4 | 6 | 5 | 6 | 1 |
| white*5 | 5 | 4 | 3 | 3 | 1 | 4 | 2 | 4 | 4 | 1 |

Remarks:

*1 shows the following grade for the vinyl chloride resin
I-1   Kureha PVC S-901
      (Kureha Kagaku) polymerization degree $\bar{p}$ = 1000
I-2   Kureha PVC S-903
      (Kureha Kagaku) polymerization degree $\bar{p}$ = 1300
II-1  Product-1 of Company K polymerization degree $\bar{p}$ = 1000
II-1  Product-2 of Company K polymerization degree $\bar{p}$ = 1300
II-1  Product-1 of Company G polymerization degree $\bar{p}$ = 1000
II-2  Product-2 of Company G polymerization degree $\bar{p}$ = 1300
IV-1  Product-1 of Company T polymerization degree $\bar{p}$ = 1000
IV-2  Product-2 of Company T polymerization degree $\bar{p}$ = 1300
V-1   Product-1 of Company A polymerization degree $\bar{p}$ = 1000
V-2   Product-2 of Company A polymerization degree $\bar{p}$ = 1300
*2 Tin mercaptide type stabilizer; Mark 465E (di-n-octyl tin mercaptide, manufactured by Adeka Argus)
*3 Low molecular weight polyethylene: Highwax 405 HP manufactured by Mitsui Petrochemical Co.
*4 Estimation: appearance after exposed to weatherometer test for 300 hours subsequent to electron ray irradiation

TABLE 1-continued at 10 Mrad level irradiation

| Estimation | Transparent film | (white film) |
|---|---|---|
| 10 | no change at all | (white, no change at all) |
| 9 | with no substantial change but slight fine spots recognized | (white, somewhat changed) |
| 8 | fine spot recognized slightly | (pale ivory) |
| 7 | red-brown fine spots entirely | (ivory) |
| 6 | red-brown spots rather remarkable | (pale gray) |
| 5 | large red-brown spots entirely | (pale gray) |
| 4 | entirely colored red-brown | (dense pale gray) |
| 3 | entirely colored black brown to red-brown | (camel) |
| 2 | entirely black but flexible | (dense camel) |
| 1 | entirely black and easily broken | (more dense camel) |

*[5] Film: 10 PHR titanium oxide (TiO$_2$) added

TABLE 2

| | Example | | Comparative Example | | | | | | | |
|---|---|---|---|---|---|---|---|---|---|---|
| | 3 | 4 | 9 | 10 | 11 | 12 | 13 | 14 | 15 | 16 |
| Vinyl chloride resin*[6] | 100 | 100 | 100 | 100 | 100 | 100 | 100 | 100 | 100 | 100 |
| Plasticizer | | | | | | | | | | |
| DOP | | | | 20 | 20 | 20 | | 20 | 20 | 20 |
| DOS | 30 | 30 | | 10 | | 5 | | 10 | | 5 |
| DOA | | | 30 | | 10 | 5 | 30 | | 10 | 5 |
| Epoxidized | | | | | | | | | | |
| Soybean oil | 5 | | 5 | 5 | 5 | 5 | | | | |
| Linseed oil | | 5 | | | | | 5 | 5 | 5 | 5 |
| Mark 465E*[7] | 1.5 | 1.5 | 1.5 | 1.5 | 1.5 | 1.5 | 1.5 | 1.5 | 1.5 | 1.5 |
| Highwax*[8] | 0.5 | 0.5 | 0.5 | 0.5 | 0.5 | 0.5 | 0.5 | 0.5 | 0.5 | 0.5 |
| Estimation | | | | | | | | | | |
| transparent | 10 | 10 | 4 | 6 | 10 | 3 | 8 | 9 | 8 | 8 |
| white | 10 | 10 | 4 | 8*[9] | 4 | 3 | 4 | 5 | 3 | 3 |

*[6] Kureha S-903 manufactured by Kureha Kagaku
*[7] Dioctyl tin mercaptide manufactured by Adeka Argus
*[8] High wax 405 HP, manufactured by Mitshi Petrochemical Co.
*[9] White back ground unchanged but fine red-brown spots prevailed entirely.

TABLE 3

| | Example | | | Comparative Example | | | | |
|---|---|---|---|---|---|---|---|---|
| | 5 | 6 | 7 | 17 | 18 | 19 | 20 | 21 |
| Kureha S-903 | 100 | 100 | 100 | 100 | 100 | 100 | 100 | 100 |
| DOP | 30 | 30 | 30 | 30 | 30 | 30 | 30 | 30 |
| Stabilizer | | | | | | | | |
| 1*[10] | | | | 1.5 | 1.5 | | | |
| 2*[11] | 3.0 | 4.5 | 6.0 | | | 1.5 | 1.5 | 1.5 |
| Epoxidized soybean oil | 5 | 5 | 5 | 5 | 5 | 5 | 5 | 5 |
| Zinc stearate | | | | 0.1 | 0.2 | | 0.1 | 0.2 |
| Highwax 405HP | 0.5 | 0.5 | 0.5 | 0.5 | 0.5 | 0.5 | 0.5 | 0.5 |
| Estimation | | | | | | | | |
| transparent | 10 | 10 | 10*[12] | 9 | 9 | 9 | 9 | 9 |
| white | 10 | 10 | 10 | 7 | 7 | 8 | 4 | 4 |

Remark:
*[10] Mark 465E: di-n-octyl tin mercaptide, manufactured by Adeka Argus
*[11] Mark 1292: dibutyl tin mercaptide by Adeka Argus
*[12] Appears to be pigmented pale brown entirely

TABLE 4

| | Example | | | Comparative Example | | | | |
|---|---|---|---|---|---|---|---|---|
| | 8 | 9 | 10 | 22 | 23 | 24 | 25 | 26 |
| Kureha S-903 | 100 | 100 | 100 | 100 | 100 | 100 | 100 | 100 |
| DOP | 30 | 30 | 30 | 30 | 30 | 30 | 30 | 30 |
| Epoxidized soybean oil | 5.0 | 5.0 | 5.0 | 5.0 | 5.0 | 5.0 | 5.0 | 5.0 |
| Mark 1292 | 3.0 | 3.0 | 3.0 | 3.0 | 3.0 | 3.0 | 3.0 | 3.0 |
| Highwax 405HP | 0.5 | 0.5 | 0.5 | 0.5 | 0.5 | 0.5 | 0.5 | 0.5 |
| External lubricant*[13] | | | | | | | | |
| 1 | 1.0 | | 0.5 | | | | | |
| 2 | | 1.0 | 0.5 | | | | | |
| 3 | | | | 1.0 | | | | |
| 4 | | | | | 1.0 | | | |
| 5 | | | | | | 1.0 | | |

TABLE 4-continued

|  | Example | | | Comparative Example | | | | |
| --- | --- | --- | --- | --- | --- | --- | --- | --- |
|  | 8 | 9 | 10 | 22 | 23 | 24 | 25 | 26 |
| 6 |  |  |  |  |  |  | 1.0 |  |
| 7 |  |  |  |  |  |  |  | 1.0 |
| Roll heat resistance*14 |  |  |  |  |  |  |  |  |
| Adherence | none | none | none | 20 | —*15 | 15 | —*15 | 15 |
| Coloration | slight | slight | slight | high | —*15 | high | —*15 | high |
| Estimation |  |  |  |  |  |  |  |  |
| transparent | 10 | 10 | 10 | 10 | — | 10 | — | 10 |
| white | 10 | 10 | 10 | 8 | — | 6 | — | 8 |

Remark:
*13Contents of external lubricant are as follows:
1 Mark LS-3: acryl oligomer type liquid lubricant; manufactured by Adeka Argus Co.
2 Mark LS-5: acryl oligomer type liquid lubricant; manufactured by Adeka Argus Co.
3 Methaprene L-1000: acryl type high molecular lubricant (powder); manufactured by Mitsubishi Rayon Co.
4 Methaprene PA-100: acryl type high molecular lubricant (powder); manufactured by Kanegafuchi Kagaku
5 Ca-stearate (powder)
6 Stearyal alcohol (powder)
7 Stearic acid (powder)
*14Roll heat resistance test:
Roll adherence and heat discoloration in continuous roll heat resistant test at 180° C. × 30 min. Numerals such as 15 min, etc mean the time when remarkable roll adherence occurs.
*15Roll adherence remarkable and sheeting impossible.

TABLE 5

| Grade | Physical property | |
| --- | --- | --- |
| Mark LS-3 | Specific gravity (25° C.) | 1.04~1.07 |
|  | Viscosity (25° C.) | 10.000~40.000 CPS |
|  | Refractive index (25° C.) | 1.463~1.473 |
| Mark LS-5 | Specific gravity (25° C.) | 0.975~0.990 |
|  | Viscosity (25° C.) | 3,000~8,000 CPS |
|  | Refractive index (25° C.) | 1.466~1.472 |
| Mark FC-112 | Specific gravity (25° C.) | 0.975~0.990 |
|  | Viscosity (25° C.) | 800~2,800 CPS |
|  | Refractive index (25° C.) | 1.455~1.465 |
| Mark FC-113 | apparent specific gravity (25° C.) | 0.45~0.55 |
|  | softening point | 80~90° C. |
|  | melt viscosity (170° C.) | 15~20 P |

What is claimed is:

1. A vinyl chloride-coated sheet comprising a metal sheet comprising:
   (a) a surface coated with an adhesive adapted to be cured by electron radiation without the need for heating; and
   (b) a vinyl chloride film laminated to said coated surface, said vinyl chloride film comprising a mixture which comprises:
      (i) a vinyl chloride resin;
      (ii) from about 20 to about 40 parts by weight of a plasticizer comprising dioctyl sebacate;
      (iii) from about 1.0 to about 6.0 parts by weight of a di-n-octyl tin mercaptide stabilizer; and
      (iv) a low molecular weight polyethylene lubricant.

2. The vinyl chloride-coated sheet of claim 1, wherein said metal sheet is a steel sheet.

3. The vinyl chloride-coated sheet of claim 2, wherein said steel sheet is selected from the group consisting of a zinc plated steel sheet and a cold rolled steel sheet.

4. A vinyl chloride-coated sheet comprising a metal sheet comprising:
   (a) a surface coated with an adhesive adapted to be cured by electron radiation without the need for heating; and
   (b) a vinyl chloride film laminated to said coated surface, said vinyl chloride film comprising a mixture which comprises:
      (i) a vinyl chloride resin;
      (ii) from about 20 to about 40 parts by weight of a phthalic acid ester plasticizer;
      (iii) from about 1.0 to about 6.0 parts by weight of a dibutyl tin mercaptide stabilizer; and
      (iv) a low molecular weight polyethylene lubricant.

5. The vinyl chloride-coated sheet of claim 4, wherein said metal sheet is a steel sheet.

6. The vinyl chloride-coated sheet of claim 5, wherein said steel sheet is selected from the group consisting of a zinc plated steel sheet and a cold rolled steel sheet.

7. The vinyl chloride-coated sheet of claim 4, wherein said phthalic acid ester plasticizer is selected from the group consisting of dibutyl phthalate, diheptyl phthalate, di-2-ethylhexyl phthalate, dinonyl phthalate, and diisodecyl phthalate.

8. A vinyl chloride-coated sheet comprising a metal sheet comprising:
   (a) a surface coated with an adhesive adapted to be cured by electron radiation without the need for heating; and
   (b) a vinyl chloride film laminated to said coated surface, said vinyl chloride film comprising a mixture which comprises:
      (i) a vinyl chloride resin;
      (ii) from about 20 to about 40 parts by weight of a phthalic acid ester plasticizer;
      (iii) from about 1.0 to about 6.0 parts by weight of a dibutyl tin mercaptide stabilizer; and
      (iv) a lubricant comprising a low molecular weight polyethylene lubricant and a liquid acrylic oligomer lubricant.

9. The vinyl chloride-coated sheet of claim 8, wherein said metal sheet is a steel sheet.

10. The vinyl chloride-coated sheet of claim 9, wherein said steel sheet is selected from the group consisting of a zinc plated steel sheet and a cold rolled steel sheet.

11. The vinyl chloride-coated sheet of claim 8, wherein said phthalic acid ester plasticizer is selected from the group consisting of dibutyl phthalate, diheptyl phthalate, di-2-ethylhexyl phthalate, dinonyl phthalate, and diisodecyl phthalate.

* * * * *

UNITED STATES PATENT AND TRADEMARK OFFICE
CERTIFICATE OF CORRECTION

PATENT NO. : 5,015,531                     Page 1 of 2
DATED     : May 14, 1991
INVENTOR(S) : S. Moriizumi, et al It is certified that error appears in the above-identified patent and that said Letters Patent is hereby corrected as shown below:

On the cover page, in item [57] "ABSTRACT", line 12, after "and" delete ",".

At column 1, line 15, after "specifically" insert ---,---.

At column 1, line 19, after "material" insert ---,---.

At column 1, line 30, after "paint" delete "and".

At column 1, line 63, change "of pastes" to ---of the paste---.

At column 1, line 67, after "the" insert ---previously described---.

At column 1, line 67, after "method" delete "previously".

At column 1, line 68, before "a method" delete "described".

UNITED STATES PATENT AND TRADEMARK OFFICE
CERTIFICATE OF CORRECTION

PATENT NO. : 5,015,531
DATED : May 14, 1991
INVENTOR(S) : S. Moriizumi, et al

It is certified that error appears in the above-identified patent and that said Letters Patent is hereby corrected as shown below:

At column 3, line 20, after "however" insert ---,---.

At column 3, line 32, after "however" insert ---,---.

At column 4, line 20, "sheet a," should be changed to ---sheet, a---.

At column 4, line 59, "on" should be changed to ---or---.

At column 7, line 29, after "While" delete "blending".

At column 7, line 51, after "suitably" delete "be".

At column 7, line 64, "after "sheeting" delete "to".

Signed and Sealed this

Twenty-fourth Day of March, 1998

Attest:

BRUCE LEHMAN

*Attesting Officer*   *Commissioner of Patents and Trademarks*